United States Patent
Dwyer et al.

(10) Patent No.: US 9,746,091 B2
(45) Date of Patent: Aug. 29, 2017

(54) NOZZLE-TYPE CHECK VALVE WITH PISTON

(71) Applicant: Crane Nuclear, Inc., Kennesaw, GA (US)

(72) Inventors: David B. Dwyer, River Forest, IL (US); Joshua Howard Riegle, Manteno, IL (US); Jason P. Lambin, New Lenox, IL (US); John Kornijenko, Oak Lawn, IL (US); Bruce W. Harry, Aurora, IL (US)

(73) Assignee: Crane Nuclear, Inc., Kennesaw, GA (US)

( * ) Notice: Subject to any disclaimer, the term of this patent is extended or adjusted under 35 U.S.C. 154(b) by 100 days.

(21) Appl. No.: 14/637,460

(22) Filed: Mar. 4, 2015

(65) Prior Publication Data
US 2016/0258544 A1    Sep. 8, 2016

(51) Int. Cl.
| F16K 15/02 | (2006.01) |
| F16K 27/02 | (2006.01) |
| F16K 15/06 | (2006.01) |
| F16K 15/18 | (2006.01) |
| F16K 17/30 | (2006.01) |

(52) U.S. Cl.
CPC ......... *F16K 15/025* (2013.01); *F16K 15/063* (2013.01); *F16K 15/18* (2013.01); *F16K 17/30* (2013.01); *F16K 27/0209* (2013.01)

(58) Field of Classification Search
CPC .... F16K 15/025; F16K 27/0209; F16K 15/18; F16K 17/30; F16K 15/063
USPC ........... 73/37, 861.58, 861.53; 137/542, 219, 137/220
See application file for complete search history.

(56) References Cited

U.S. PATENT DOCUMENTS

| 4,699,166 | A |   | 10/1987 | Gold et al. |
| 4,766,929 | A | * | 8/1988  | Yaindl ................ F16J 15/062 |
|           |   |   |         | 137/514.3 |
| 6,029,691 | A | * | 2/2000  | Tavor ................. F16K 1/12 |
|           |   |   |         | 137/219 |

(Continued)

FOREIGN PATENT DOCUMENTS

JP    2009-138888    6/2009    ............ F16K 15/16

OTHER PUBLICATIONS

International Search Report & Written Opinion dated May 31, 2016, from co-pending PCT application No. PCT/US2016/020544.
(Continued)

*Primary Examiner* — Harshad R Patel
*Assistant Examiner* — Suman K Nath
(74) *Attorney, Agent, or Firm* — Louis T. Isaf

(57) ABSTRACT

An exercisable check valve having a fluid delivery test channel and piston closure is disclosed herein. A valve closure member stops flow through the valve in the presence of backwards pressure or when engaged by the piston. The valve may be tested by applying a pressure source to the fluid delivery test channel to cause the piston to engage the valve closure member and stop flow through the valve. A test rod may then be inserted into a test rod port to ensure the valve closure member is in the proper closed position. The check valve may also include a biasing element to bias the valve closure member to an open position and a drainage channel. The check valve may be used in any piping or valve system.

17 Claims, 8 Drawing Sheets

(56) References Cited

U.S. PATENT DOCUMENTS

| | | | | |
|---|---|---|---|---|
| 2002/0084224 A1* | 7/2002 | Tovar De Pablos | .... | H01F 1/447 |
| | | | | 210/695 |
| 2007/0044848 A1* | 3/2007 | Norman | ................ | F16K 15/063 |
| | | | | 137/542 |
| 2009/0145497 A1* | 6/2009 | Takeda | .................. | F16K 15/063 |
| | | | | 137/535 |
| 2009/0250123 A1* | 10/2009 | Matsubara | ............ | F16K 15/063 |
| | | | | 137/528 |
| 2012/0160346 A1* | 6/2012 | Shelcoviz | ............... | F16K 1/126 |
| | | | | 137/517 |

OTHER PUBLICATIONS

Curtiss-Wright—Enertech Nozzle Check Valve: Model XRV NIC 2014; Jun. 10, 2014.

Flowserve—Check Valve Design and Testing Updates; 2015 Nuclear Industry Check (NIC) Valve Conference; Jun. 17, 2015; Floyd Bensinger, PE, Flowserve Portfolio Manager.

* cited by examiner

NOZZLE-TYPE CHECK VALVE WITH PISTON

TECHNICAL FIELD

This invention generally relates to check valves, and more specifically to an exercisable, biased, nozzle-type check valve having a piston assembly.

BACKGROUND OF THE INVENTION

Valves are conventionally used in a number of applications to control the flow of fluids through piping systems. Traditionally in conventional check valves, including flap-type valves, ball valves, disc valves, and the like, the check valve is configured to allow flow in only one direction through the piping system. Such a check valve may allow fluid flow past the valve closure member in one direction while preventing fluid from flowing in the other direction, for example, toward a compressor or pump. In this way, check valves can be used to protect a compressor, pump, or other component from backwards flow or backwards pressure (backpressure).

In some applications, check valves are biased via a spring or other biasing mechanism. For example, "normally open" valves are biased open, requiring backpressure to close the valve and "normally closed" valves are biased closed, requiring forward pressure to open the valve. When either valve is operating correctly, the valve remains open while fluid is flowing through the valve in a forward direction, from an inlet to an outlet, and if the fluid flow reverses, the valve closes. This prevents flow in an unintended direction.

For both types of check valves, the valve may be installed in a plant or factory where the valve may not require replacement for the life of the plant or factory. However, to ensure safe operating conditions, there may be a desire to verify the operation of the check valve to ensure that the valve properly prevents backwards flow. Further, there may be regulatory requirements requiring periodic verification of proper operation. However, it is difficult or impractical to test a conventional check valve, since testing will often require either inducing backwards flow in the plant or factory or removing the valve, possibly requiring a significant halt in production.

Exercisable check valves do exist for which proper operation may be verified by testing. See, for example, U.S. Pat. No. 8,701,693.

However, there is a desire in the industry to enhance the ability to exercise a check valve to verify proper operation, such that a continuing need exists for a more efficient method and system to quickly and easily test the operation of a check valve without requiring significant additional clean up and without causing significant generation of waste.

SUMMARY OF THE INVENTION

Briefly described, the present disclosure generally describes an exercisable check valve having a piston assembly. According to one embodiment, the check valve of the present disclosure includes a valve body having an inlet, an outlet, and a flow passage between and fluidly connecting the inlet and outlet. The check valve also includes a valve closure member, a piston assembly, and a test fluid delivery channel. According to some embodiments, the check valve also includes a biasing element that causes the check valve to be normally biased open. The valve is suitable for use in any conventional piping system, or the like.

In the presence of forward flow, the check valve remains open while fluid flows into the inlet, through the flow passage, and out the outlet, such that fluid may flow through the valve and any associated piping system. In the case of reverse flow or backpressure, the reverse flow or backpressure will cause the valve closure member to engage the valve body to interrupt flow through the check valve. In this way, the check valve only allows flow in one direction.

The piston assembly is used to drive the valve closure member during testing of the valve and includes a piston bore received in a support member within the flow passage and a piston at least partially received in the piston bore. A test fluid delivery channel fluidly connects the exterior of the valve body to the piston bore. To verify proper operation of the check valve, a user applies a source of pressure to the test fluid delivery channel. Application of pressure will cause the piston to move relative to the piston bore, driving the valve closure member and causing the valve closure member to engage the valve body to interrupt fluid flow through the flow passage. A rod may then be inserted through a port in the valve to determine whether the closure member is in the proper closed position. In this way, the valve may be exercised and tested without being removed from a piping system, without inducing significant backwards flow through the piping system, and without significant clean-up.

Various objects, features, and other advantages of the present invention will become apparent to those skilled in the art upon a review of the following detailed description when taken in conjunction with the accompanying drawings.

DETAILED DESCRIPTION OF THE INVENTION

Figure 1:
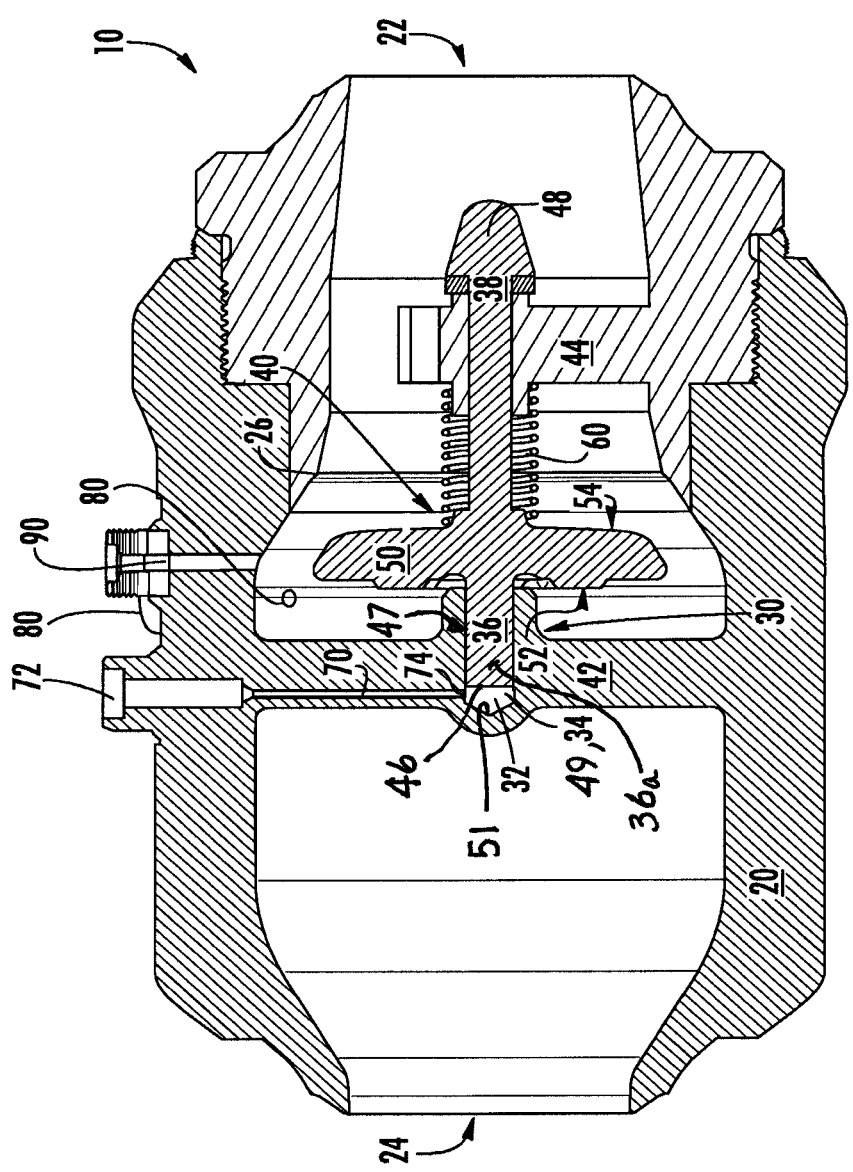
FIG. 1 is a cross-sectional profile view of an exemplary check valve in an open configuration, according to a first embodiment of this disclosure.
Figure 2:
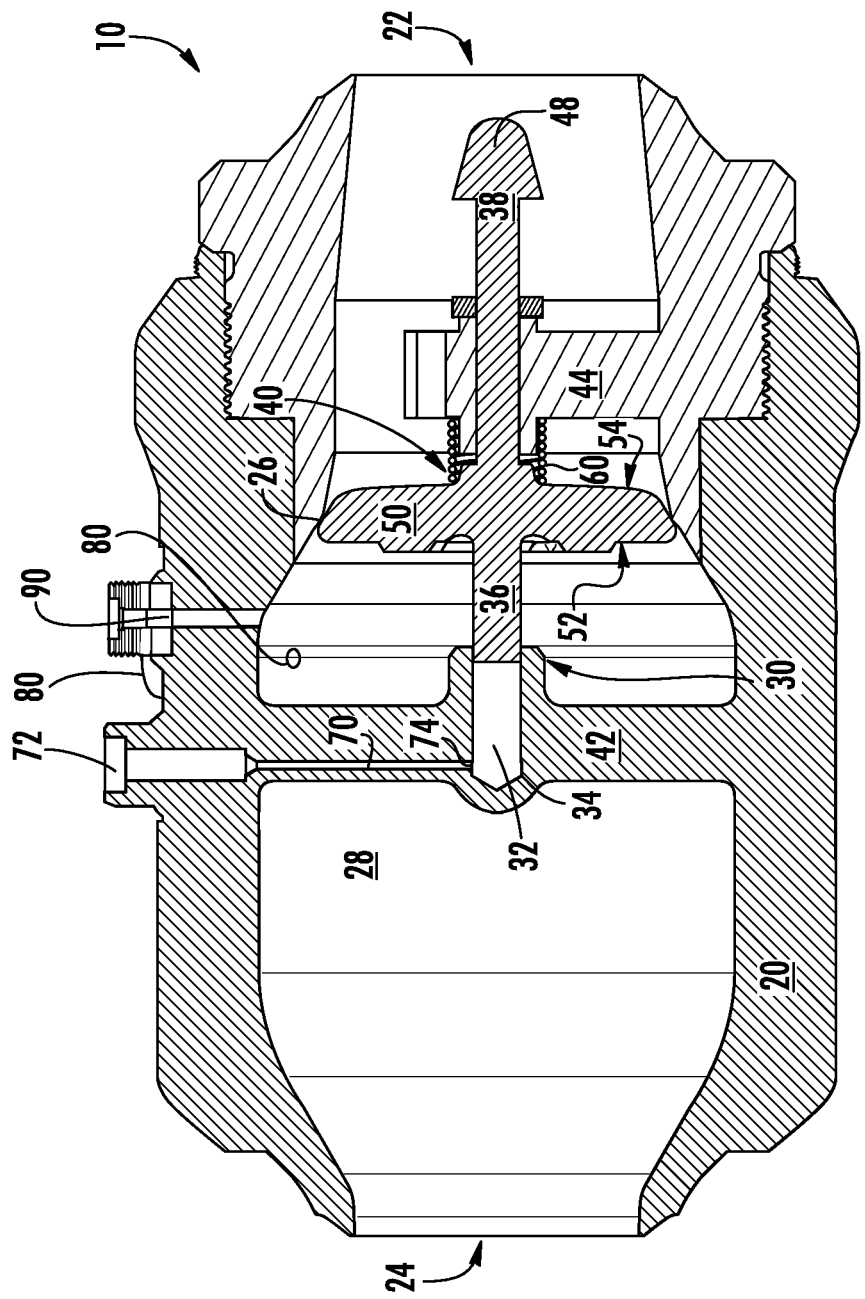
FIG. 2 is a cross-sectional profile view of an exemplary check valve in a closed configuration, according to a first embodiment of this disclosure.
Figure 3:
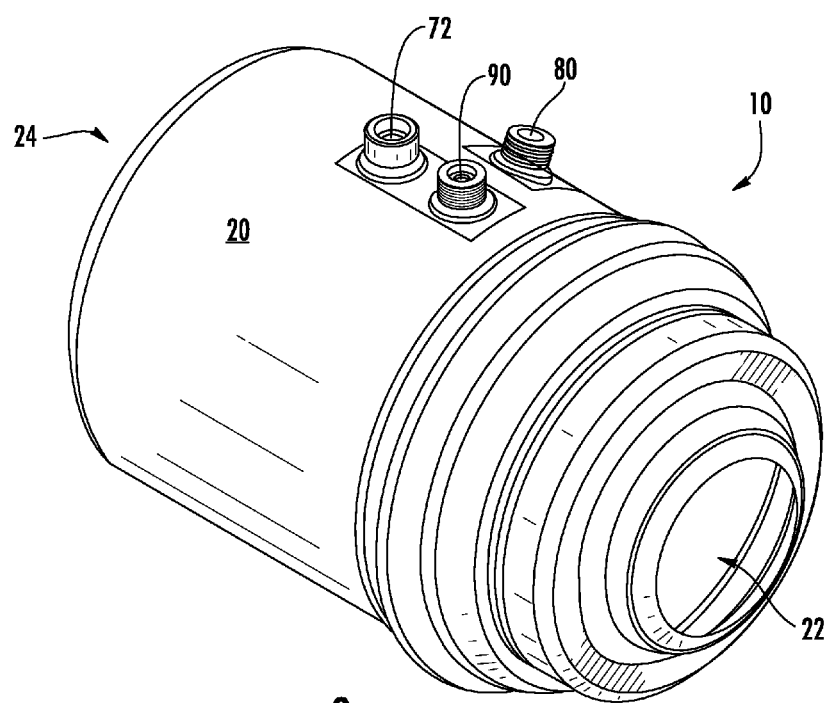
FIG. 3 is a perspective view of an exemplary check valve according to a first embodiment of this disclosure.
Figure 4:
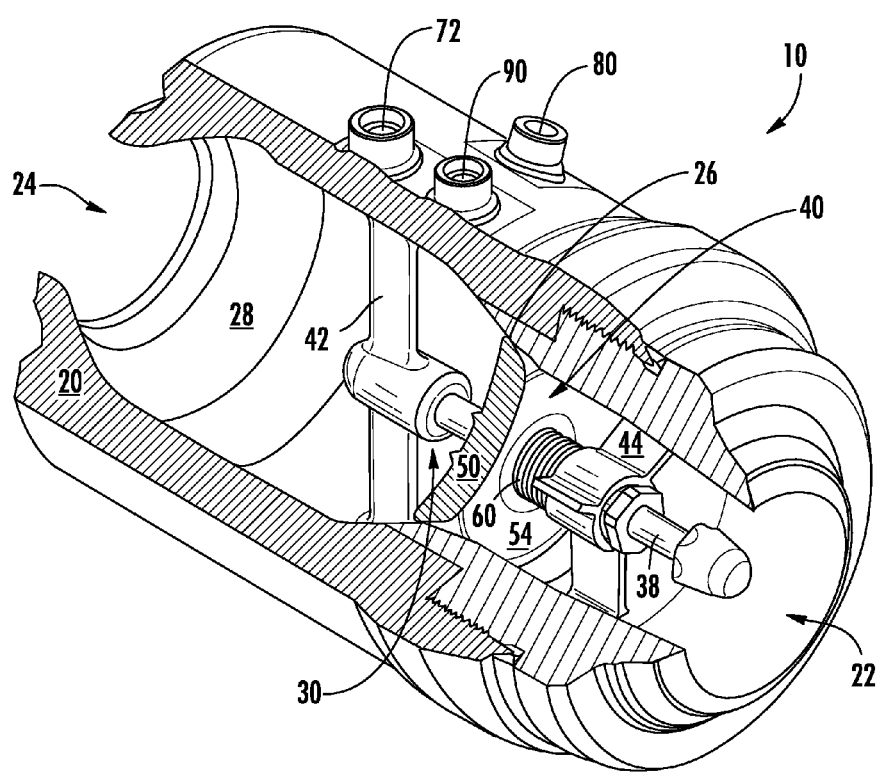
FIG. 4 is a perspective view of an exemplary check valve with a section of the valve body cut away, in a closed configuration, according to a first embodiment of this disclosure.
Figure 5:
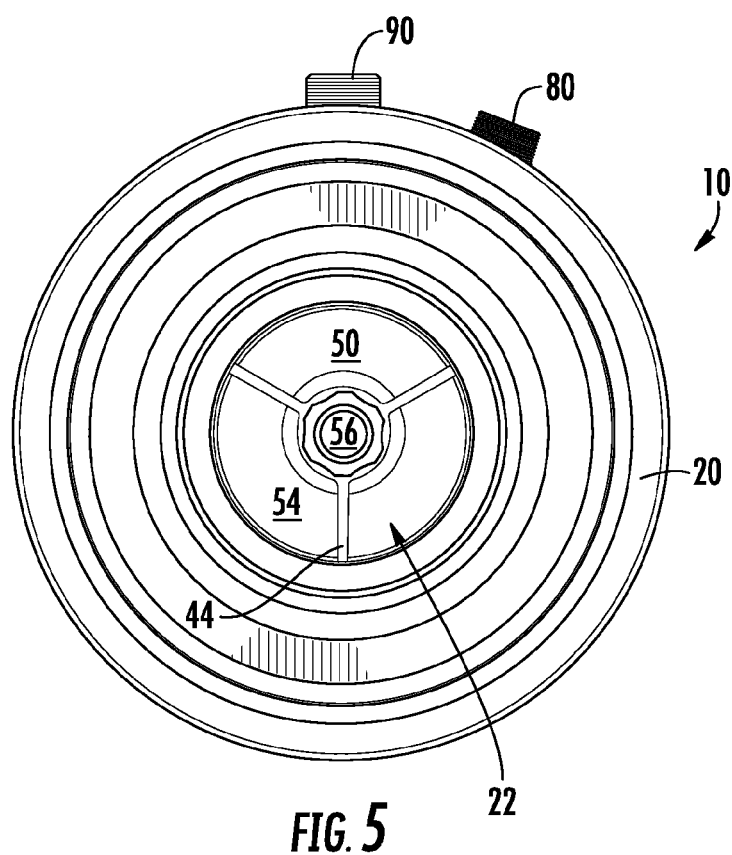
FIG. 5 is an end view of an exemplary check valve according to a first embodiment of this disclosure from a perspective taken looking directly into the inlet.
Figure 6:
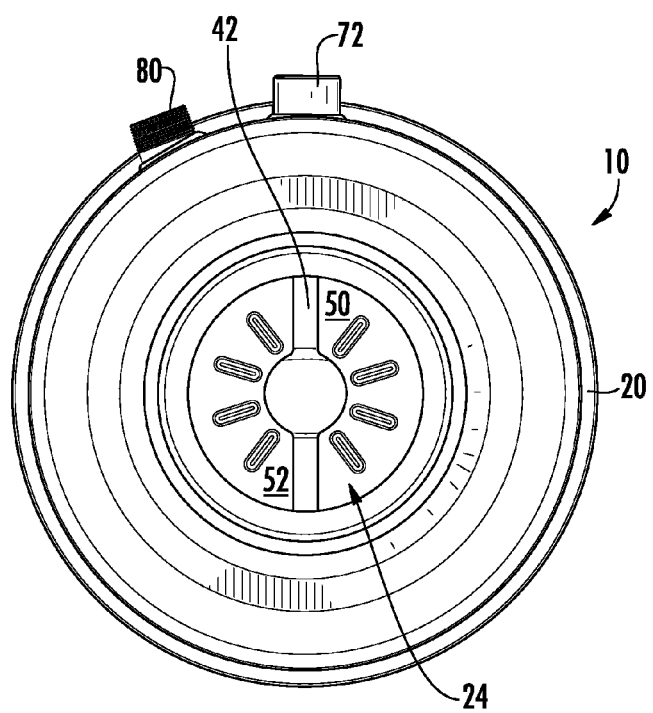
FIG. 6 is an end view of an exemplary check valve according to a first embodiment of this disclosure from a perspective taken looking directly into the outlet.
Figure 7A:
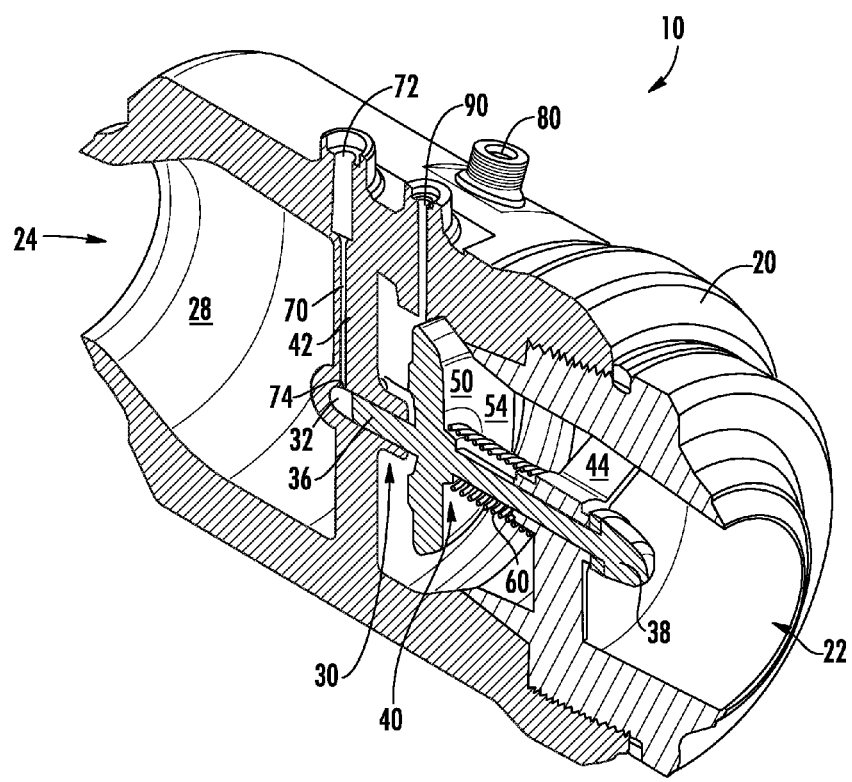
FIG. 7a is a cross-sectional perspective view of an exemplary check valve in an open configuration, according to a first embodiment of this disclosure.
Figure 7B:
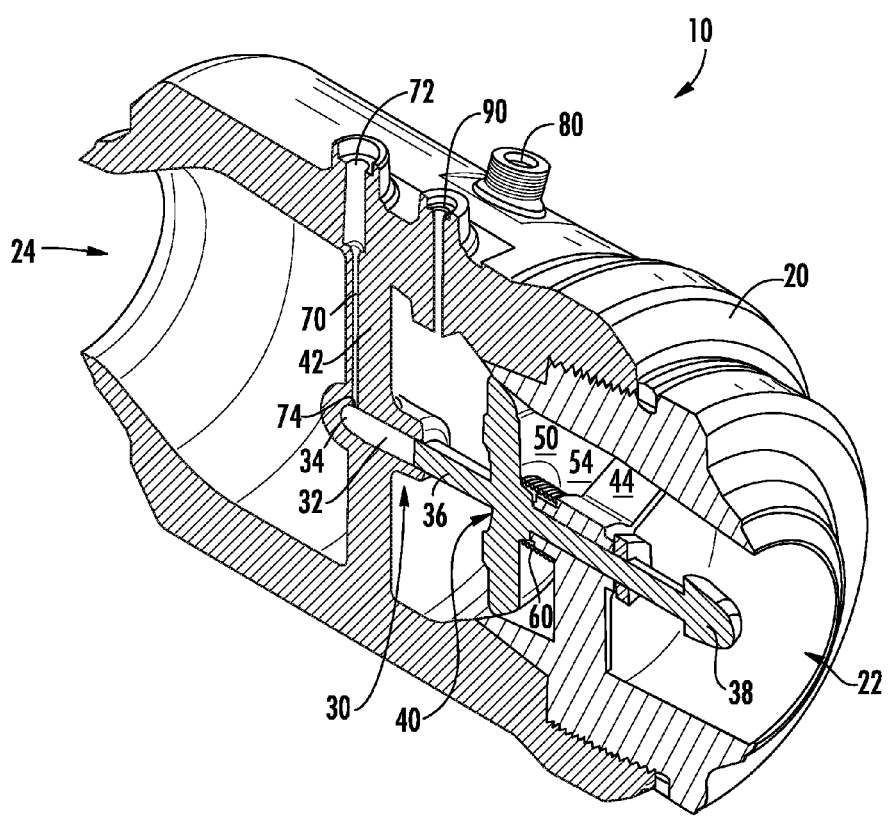
FIG. 7b is a cross-sectional perspective view of an exemplary check valve in a closed configuration, according to a first embodiment of this disclosure.

Referring now in greater detail to the drawings in which like numerals refer to like parts throughout the several views, FIGS. 1 and 2 respectively illustrate one embodiment of an exercisable check valve 10 according to the present disclosure in an open and a closed configuration. However, it will be understood by those skilled in the art that the check valve disclosed herein is suitable for use with any type of piping or tubing system, or the like, including in the piping system of a factory or plant, such as a power plant. The present disclosure thus is not and should not be limited solely for use with a particular type or types of piping or flow delivery system.

Although the following description includes an exemplary check valve and methods that embody the inventive subject matter of this disclosure, it will be understood by a person of ordinary skill in the art that the described subject matter may be practiced with some or all features of the embodiments disclosed herein in various combinations to create various other embodiments not expressly disclosed herein but nonetheless within the scope of this disclosure.

FIG. 1 is a cross-sectional view of a check valve 10 in an open configuration according to an embodiment of the present disclosure. The check valve 10 includes a valve body 20 having an inlet 22, an outlet 24, a flow passage 28 between and fluidly connecting the inlet 22 and outlet 24, and a piston assembly 30. The valve 10 is configured to allow flow into the inlet 22, through the flow passage 28, and out from the outlet 24, and to prevent flow of fluid in the reverse direction, i.e. from the outlet 24 to the inlet 22.

According to the embodiment shown in FIGS. 1 and 2, the piston assembly 30 includes a piston bore 32 and a piston 36 at least partially received in the piston bore 32. The piston bore 32 is formed in a downstream support member 42, and the downstream support member 42 is fixed relative to the valve body 20.

Still according to the embodiment shown in FIGS. 1 and 2, a valve closure member 50 is received in the flow passage 28. The valve closure member 50 is supported in such a way as to be movable between at least an open position in which fluid may flow through the flow passage 28 and a closed position in which the valve closure member 50 cooperates with the valve body 20 (by, for example, sealing at a valve closure seat 26) to interrupt fluid flow through the flow passage 28. The valve closure member 50 is engaged by the piston 36 such that the piston 36 acts to move the valve closure member 50 to the closed position when the piston 36 is moved from a first position to a second position.

According to some embodiments, the piston 36 and valve closure member 50 are coupled so that movement of the piston 36 to and from the first and second positions causes respective movement of the valve closure member 50 to and from the open and closed positions. In some such embodiments, a biasing element 60 is coupled to either the piston 36 or the valve closure mechanism 50 to respectively bias either the piston 36 to its first position or the valve closure member 50 to its open position.

FIG. 2 depicts a cross-sectional view of a check valve 10 in the closed configuration according to some embodiments. The presence of backwards flow or pressure in the direction from the outlet 24 to the inlet 22 causes the valve closure member 50 to move to the closed position. In the closed position, the valve closure member 50 engages the valve closure seat 26, thus cooperating with the valve body 20 to block fluid flow through the flow passage 28 from the outlet 24 to the inlet 22. This feature is particularly desirable in situations where equipment which could become damaged from reverse flow, such as a pump or compressor, is located upstream from the check valve 10. Further, this feature of preventing reverse flow may be required for compliance with safety regulations.

A fluid delivery test channel 70 fluidly connects the interior of the piston bore 32 with the exterior of the valve body 20. Application of fluid or another pressure source to the fluid delivery test channel 70 causes the piston 36 to move from the first position to the second position which in turn causes the valve closure member 50 to move to the closed position. In this way, the fluid delivery test channel 70 can be used to cause the valve closure member 50 to be in the closed position.

The check valve 10 according to some embodiments further includes additional ports 80, 90 that fluidly connect the exterior of the valve body with the interior of the flow passage. These ports are configured to support inspections as will be understood by those of ordinary skill in the art.

With reference to FIGS. 1 and 2, operation of the fluid delivery test channel 70 and piston assembly 30 will now be described according to some embodiments. As previously mentioned, the piston bore 32 is located within the downstream support member 42 and the piston 36 is at least partially received within the piston bore 32. According the embodiment shown in FIGS. 1 and 2, the fluid delivery test channel 70 extends from a fluid delivery test channel opening 72 in the valve body, to another fluid delivery test channel opening 74 in the rear portion 34 of the piston bore 32. To test the operation of the valve and to ensure its ability to properly prevent flow in the reverse direction (i.e. from outlet 24 to inlet 22), a source of pressurized fluid (e.g. a liquid), is connected to the valve body fluid delivery test channel opening 72, and the pressurized fluid is introduced through the test channel 70.

The piston assembly 30 (including piston 36 and piston bore 32) is configured in a manner as will be understood by those skilled in the art, upon reference to the attached drawing figures in this description, such that the pressure source causes pressure to build up behind the piston 36 in the rear portion 34 of the piston bore 32, causing a force to act on the piston end 46 sufficient to move the piston 36 from the first position to the second position, in turn causing the valve closure member 50 to move to the closed position. According to one exemplary configuration by which pressure is built up behind the piston 36 causing a force to act on the piston end 46, at least a portion 36a of piston 36 is at least partially received in the piston bore 32 and substantially mates with the piston bore such that the piston is received with a close fit (in the absence of a separate seal component, as depicted in FIG. 1, as partially represented at 47 of FIG. 1), between an outer surface of the piston and an inner surface of the piston bore. With the piston portion 36a received in the bore 32, a gap 49 is defined in the piston bore between the piston end 46 and the downstream end 51 (end-wall 51) of the bore 32.

According to the embodiment of FIGS. 1 and 2, the biasing element 60 is a spring 60 mounted on the upstream side of the closure member 50 and supported as to assert pressure against the closure member 50 for normally biasing the valve closure member 50 to its open position. According to some embodiments, the biasing element 60 is supported on an upstream end by an upstream support member 44 that is fixed relative to the valve body 20, and the biasing element 60 exerts pressure against the closure member 50 and the upstream support member 44 to bias the closure member 50 to the open position.

As previously described, in some embodiments, such as shown in FIGS. 1 and 2, the piston 36 and valve closure member 50 are coupled such that when the piston 36 is in the first position, the valve closure member 50 is in the open position and when the piston 36 is in the second position, the valve closure member 50 is in the closed position. In such embodiments where the piston 36 and valve closure member 50 are coupled, it is only necessary to bias one of the valve closure member 50 and the piston 36, since the other will be biased as a result of the piston 36 and valve closure member 50 being coupled.

According to the embodiment of FIGS. 1 and 2, the coupling is in the form of rigid attachment, such as welding or forging as one component. Other forms of coupling are also acceptable, such as but not limited to hinging, linking, or the like.

As understood in the art, the piston 36 is configured such that a small amount of pressure in the piston bore 32 is sufficient to overcome the biasing force of the biasing element 60 to cause the piston 36 to move from the first position to the second position. It will be appreciated that the piston bore 32, piston 36, and biasing element 60 may be calibrated such that a predetermined amount of pressure is sufficient to overcome the biasing force of the biasing element 60. In this way, a user may calibrate the sensitivity of the check valve to backwards flow and/or test conditions.

Referring again to FIGS. 1 and 2, the biasing member 60 is a compression spring. The compression spring is calibrated such that the presence of a predetermined amount of backwards flow or backwards pressure will cause the valve closure member 50 to overcome the spring force and move to the closed position.

The valve closure member 50 of the embodiment of FIGS. 1 and 2 is in the nature of a valve closure disc 50. The piston 36 and valve closure disc 50 are components of a valve closure disc assembly 40 that further includes an upstream shaft portion 38 rigidly mounted to the disc 50 and axially aligned with and on the opposite side of the disc 50 from the piston 36. The upstream support member 44 is mounted inside the flow passage 26. The valve closure disc assembly 40 is slidably supported by and movable relative to the upstream support member 44, and the biasing member 60 is also coupled to the upstream support member 44.

The valve closure disc assembly 40 further includes first shaft end 46 (defined as the free end of the piston (or downstream shaft portion) 36), which extends into and terminates within said piston bore 32, and a second shaft end 48 (defined as the free end of the upstream shaft portion 38) which extends into and terminates within said flow passage 28. The valve closure disc 50 is coupled to the piston 36 between the first and second shaft ends 46, 48. According to some embodiments, the first shaft end 46 is the downstream end of the piston 36 (i.e. the end closer to the outlet 24), and the second shaft end 48 is the upstream end of the piston (i.e. the end closer to the inlet 22).

According to some embodiments, the valve closure disc 50 has a first valve closure disc face 52 facing the outlet 24 and a second valve closure disc face 54 facing the inlet 22. In such embodiments, the presence of backwards flow or backwards pressure causes a force to be applied to the first disc face 52. When sufficient force on the first disc face 52 is present, the disc will be moved to the closed position in which the second face 54 of the disc 50 will mate with the valve closure disc seat 26 to interrupt flow through the flow passage 28. According to some embodiments, the upstream support member 44 is positioned between the valve closure disc 50 and the second shaft end 48.

It will be understood by those skilled in the art that while the present invention has been disclosed with reference to specific embodiments as described, above, various additional, deletions, modifications and changes can be made thereto without departing from the spirit and scope of the present invention. It will also be understood that the various embodiments and/or features thereof can be combined to form additional embodiments of the present invention.

What is claimed is:

1. An exercisable check valve comprising:
    a valve body having an inlet, an outlet, and a flow passage between and fluidly connecting said inlet and said outlet;
    a valve closure member received in said flow passage, said valve closure member being movable between at least an open position in which fluid may flow through said flow passage and a closed position in which said valve closure member cooperates with said valve body such that fluid flow through said flow passage is interrupted;
    a support member positioned on a downstream side of said valve closure member; and
    a piston assembly for selectively moving the valve closure member between the open position and the closed position, the piston assembly comprising:
        a piston bore defined in the support member and positioned within said flow passage,
        a piston coupled to said valve closure member, said piston being movable between at least a first position and a second position and being at least partially received in and movable relative to said piston bore, wherein movement of said piston to said second position causes said valve closure member to move to said closed position, and
        at least one fluid delivery test channel fluidly connecting an exterior of said valve body to an interior of said piston bore;
    wherein said piston comprises a shaft having a first shaft end extending into and terminating within said piston bore.

2. The check valve of claim 1, further comprising a biasing element adapted for normally biasing said valve closure member to said open position.

3. The check valve of claim 2, wherein said closure member comprises a valve closure disc, said biasing element engages said valve closure disc on an upstream side of said valve closure disc, and said piston bore is disposed on a downstream side of said of valve closure disc.

4. The check valve of claim 1, wherein the valve closure member comprises a valve closure disc.

5. The check valve of claim 4, further comprising a valve closure disc seat, wherein said valve closure disc is adapted for engaging said valve closure disc seat when said valve closure disc is in said closed position.

6. The check valve of claim 1, wherein said piston further comprises a second shaft end, and wherein said valve closure member is coupled to said piston between said first shaft end and said second shaft end.

7. The check valve of claim 6, wherein the support member is a downstream support member and wherein the check valve further comprising an upstream support member, the downstream support member, and a biasing element adapted for normally biasing said valve closure member to said open position, wherein said piston bore extends into said downstream support member, said piston assembly extends through said upstream support member, and said biasing element is coupled to said upstream support member.

8. The check valve of claim 1, wherein said piston comprises a first portion extending from the valve closure member to the first shaft end, the first portion being at least partially received in said piston bore with a close fit between an outer surface of said piston and an inner surface of said piston bore.

9. The check valve of claim 8, wherein the first portion of the piston is in the shape of a cylinder.

10. The check valve of claim 1, further comprising at least one inspection port fluidly connecting an exterior of said valve body and an interior of said flow passage.

11. The check valve of claim 1, wherein:
   said support member is a downstream support member positioned on the downstream side of said valve closure member and said piston bore is defined in said downstream support member; and
   the check valve further comprises
      a biasing element adapted for normally biasing said valve closure member to said open configuration, and
      an upstream support member positioned on an upstream side of said valve closure member in said flow passage, wherein said biasing element is coupled to said upstream support member.

12. The check valve of claim 1, wherein said fluid delivery test channel is oriented perpendicularly to said piston bore.

13. The check valve of claim 1, wherein said piston bore defines a cavity with an end wall and a cavity opening through which the piston first shaft end is received into the bore, wherein the first shaft end is movable relative to said end wall.

14. The check valve of claim 1, wherein said piston bore defines a cavity with an end wall and a cavity opening through which the piston first shaft end is received into the bore, wherein a gap exists between the end wall of the bore and the first shaft end permitting movement of said shaft end relative to the bore end wall.

15. An exercisable check valve comprising:
   a valve body having an inlet, an outlet, and a flow passage between and fluidly connecting said inlet and said outlet;
   a valve closure member received in said flow passage, said valve closure member being movable between at least an open position in which fluid may flow through said flow passage and a closed position in which said valve closure member cooperates with said valve body such that fluid flow through said flow passage is interrupted;
   a piston assembly for selectively moving the valve closure member between the open position and the closed position;
   at least one fluid delivery test channel fluidly connecting an exterior of said valve body to an interior of a piston bore;
   a biasing element adapted for normally biasing said valve closure member to said open position; and
   a support member positioned on an upstream side of said valve closure member in said flow passage, wherein said biasing element is coupled to said support member.

16. The check valve of claim 15, wherein said biasing element is a compression spring.

17. A method for testing operation of a check valve having a valve body having an inlet, an outlet, and a flow passage between and fluidly connecting said inlet and said outlet and a valve closure member received in said flow passage, said valve closure member being movable between at least an open position in which fluid may flow through said flow passage and a closed position in which said valve closure member cooperates with said valve body such that fluid flow through said flow passage is interrupted, the method comprising:
   introducing a fluid under pressure into a piston bore through at least one fluid delivery test channel;
   moving a piston within the flow passage by the introduced fluid under pressure, the piston being at least partially received in and movable relative to the piston bore and comprising a free end within the piston bore, there being a gap defined in the piston bore between the piston free end and the downstream end of the bore, wherein the introducing the fluid under pressure into the piston bore comprises introducing fluid under pressure into the gap causing a force to act on the free end; and
   engaging the valve closure member by the piston to move the valve closure member to the closed position in response to moving of the piston.

\* \* \* \* \*